United States Patent [19]

Gheorghita

[11] Patent Number: 5,558,433
[45] Date of Patent: Sep. 24, 1996

[54] CONICAL TILTABLE AUGER APPARATUS FOR CONTINUOUSLY FEEDING EXTRUSION AND/OR ROLLING MACHINES WITH VISCOUS MATERIAL.

[75] Inventor: Victor Gheorghita, Castellanza, Italy

[73] Assignee: Pomini S.p.A., Castellanza, Italy

[21] Appl. No.: 534,956

[22] Filed: Sep. 28, 1995

[30] Foreign Application Priority Data

Oct. 27, 1994 [IT] Italy ................................. MI94A2204

[51] Int. Cl.⁶ ........................................................ B28C 7/10
[52] U.S. Cl. .................. 366/76.4; 366/156.2; 366/158.2
[58] Field of Search ................................. 366/76.1, 76.3, 366/76.4, 765, 76.6, 76.9, 76.91, 156.1, 156.2, 158.2; 425/130, 585, 587

[56] References Cited

U.S. PATENT DOCUMENTS

| | | | |
|---|---|---|---|
| 3,734,472 | 5/1973 | Strohmeier | 366/76.4 |
| 3,782,700 | 1/1974 | Wittrock | 366/76.4 |
| 4,764,020 | 8/1988 | Moriyama | 366/76.4 |
| 5,017,124 | 5/1991 | Holley | 366/158.2 X |

FOREIGN PATENT DOCUMENTS 53-36867  10/1978  Japan ...................................... 425/130

*Primary Examiner*—Charles E. Cooley
*Attorney, Agent, or Firm*—Herbert Dubno

[57] ABSTRACT

An apparatus for receiving batches of material from a mixer for continuously feeding the material to an extrusion or rolling machine has a vertical hopper which is provided on opposite sides with conical augers. The conical augers are received in respective frames which can be tilted so as to swing the augers from an inclined position wherein the augers converge downwardly in the hopper in a V pattern into substantially horizontal inoperative positions.

8 Claims, 3 Drawing Sheets

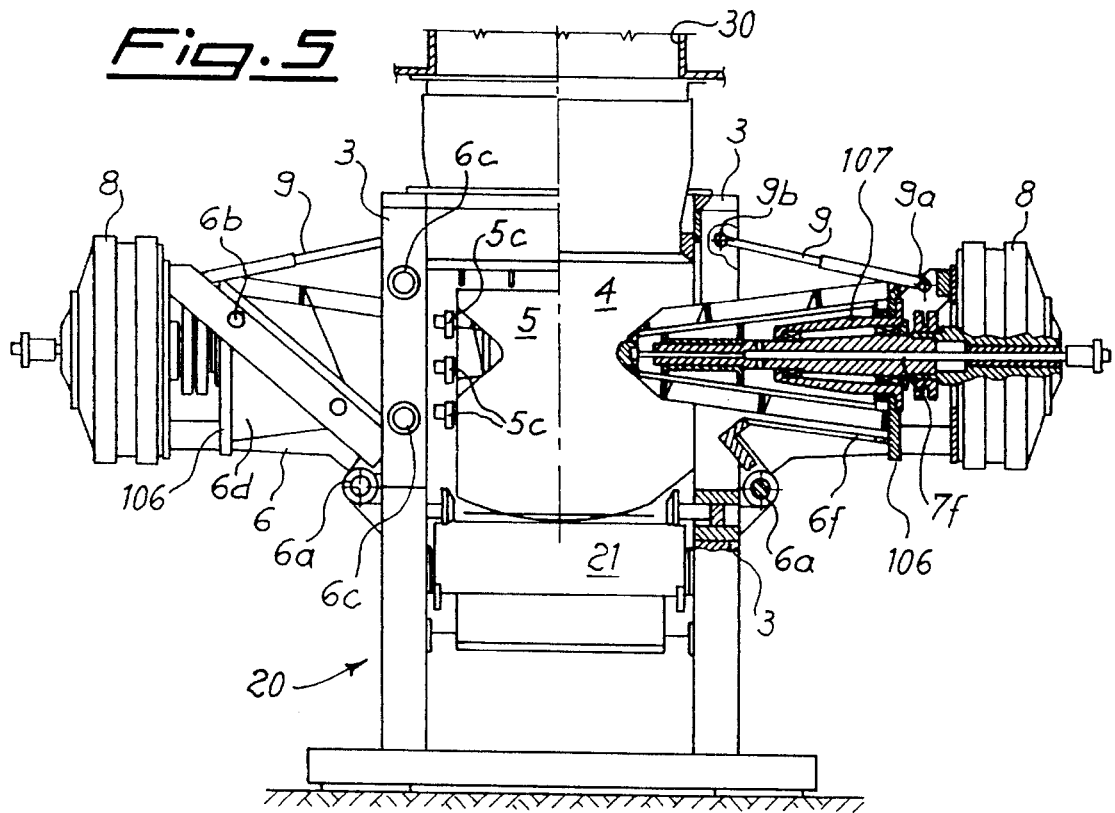
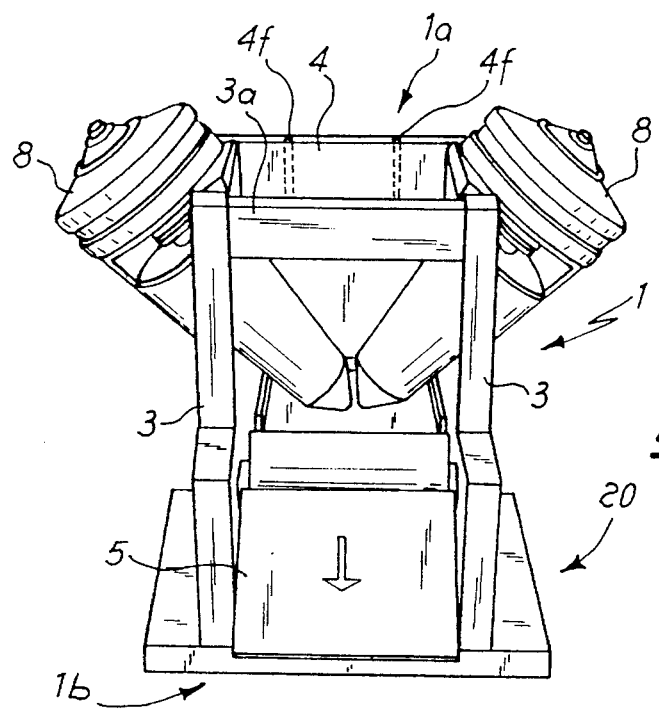

5,558,433

CONICAL TILTABLE AUGER APPARATUS FOR CONTINUOUSLY FEEDING EXTRUSION AND/OR ROLLING MACHINES WITH VISCOUS MATERIAL.

FIELD OF THE INVENTION

My present invention relates to an apparatus for continuously feeding extrusion and/or rolling machines with viscous material, such as rubber and the like received from machines operating with a discontinuous-production cycle.

BACKGROUND OF THE INVENTION

In rubber processing technology extrusion and/or rolling machines must be supplied with the mixture which emerges from the mixing machines, for example, so-called internal mixers. It is also known that the rolling and/or extrusion machines operate substantially continuously, while the mixers operate with substantially discontinuous cycles.

In the art machines and apparatus are known which are specially designed to remove as quickly as possible the batch leaving the internal mixers and to feed the material with continuity and at a predetermined throughput to the extrusion and/or rolling machine.

Such machines of the known type are based on the use of cylindrical or conical augers which are arranged with a substantially horizontal axis or are slightly inclined with respect to the horizontal, these having certain defects including the fact that said conical augers must be designed so as to be of the so-called "inter-penetrating" type, in order to obtain the necessary thrusting of the batch towards the following extrusion and/or rolling machine. Being of the inter-penetrating type, the augers cannot be independent, but must be perfectly dimensioned and synchronized with one another so as to avoid breakage and/or malfunctions. This requires the provision of complicated mechanisms which in addition to being costly and reducing the reliability of the machine, also hinder the maintenance and cleaning operations when the machine is at standstill.

A machine of this type is for example known from U.S. Pat. No. 4,764,020.

OBJECT OF THE INVENTION

The object of the invention is to provide an apparatus designed to remove in a discontinuous manner a batch of viscous material such as rubber and the like leaving a mixer or the like and to feed the mixture in a substantially continuous manner to extrusion and/or rolling machines, said apparatus being easy and economical to manufacture, and being operable without heating the material during feeding, but on the contrary cooling it in a correct manner, and simplifying the maintenance and cleaning operations when the machine is at standstill.

SUMMARY OF THE INVENTION

These results are obtained by the present invention, which provides an apparatus for continuously feeding extrusion and/or rolling machines with viscous material such as rubber and the like coming from discontinuous-cycle machines. The apparatus comprises a vertical hopper, on at least two opposite sides of which a respective conical auger is housed. The auger is inclined with respect to the vertical axis of the machine so that the two augers form a "V" directed towards the inside of the hopper. Means is provided for independently driving said augers. The apparatus also includes means for cooling the augers and at least one wall of the hopper, as well as means for tilting the augers from the inclined working position into a substantially horizontal position when the machine is at a standstill.

BRIEF DESCRIPTION OF THE DRAWINGS

The above and other objects, features, and advantages will become more readily apparent from the following description, reference being made to the accompanying drawing in which:

FIG. 5 is a partially sectioned front view of the apparatus with the augers in the tilted position; and FIG. 6 shows a front view of the apparatus with the front wall tilted for removal of the material.

SPECIFIC DESCRIPTION

As shown in the Figures, the apparatus 1 according to the invention is composed of a hopper 2 consisting of two pairs of vertical and parallel facing uprights 3 forming the longitudinal flanks of the apparatus itself and joined together in the transverse direction by stiffening cross-pieces 3a.

Figure 4:
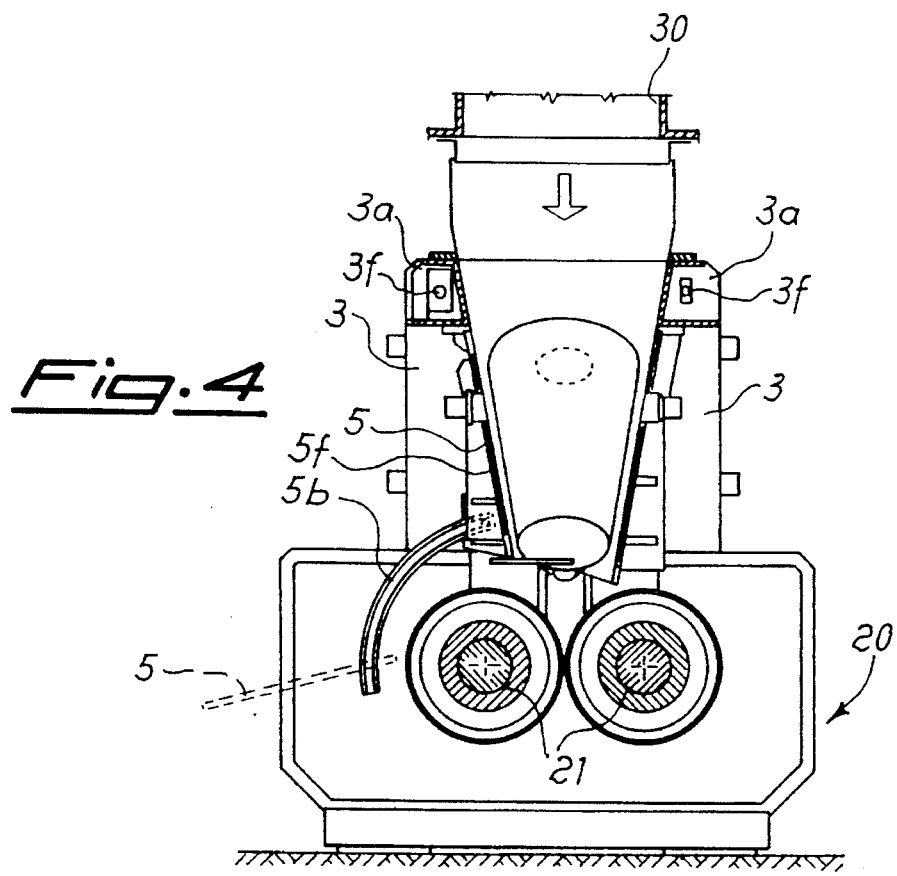
FIG. 4 is a section along the plane indicated by IV—IV in FIG. 1.

In the region of the rear side 1a of the apparatus, the two uprights are connected by a fixed wall 4, while, in the region of the front part 1b of the apparatus, the uprights are connected by a wall 5 rotatable about associated curved guides 5a, integral with the fixed sides 3, designed to allow tilting of the movable wall 5 from the erect working position, in which it is held by bolts 5b, into a position swung downwards (indicated by broken lines in FIG. 4) designed to allow access to the inside of the hopper as to well as act as a slide for any removal of material.

The vertical hopper 2 contains material to be fed to the extruder or rolling mill and is supplied for example from an internal-type mixer either by means of gravity or by a belt conveyor (not shown).

Each pair of uprights 3 arranged on the same side of the hopper also supports a frame 6 housing a respective conical auger 7, the axis of which is arranged at a predetermined angle of inclination with respect to the vertical axis of the machine; thus the two augers 7 are arranged in the form of a "V" tapering towards the inside of the hopper, which can have a substantially frusto-conical internal shape with its vertex directed downwards, suitable for promoting collection of the material and feeding thereof to an underlying machine represented, for example, in the figure by a roll-type rolling mill 20.

The support frame 6 is closed externally by a curved wall 6d parallel to the conical auger 7, and at the bottom is hinged on the fixed uprights 3 via pins 6a; the top part instead has seats 6b designed to cooperate with wedge-type cylinders 6c on the uprights 3, for locking the frame 6 to the fixed uprights themselves.

The frame has moreover a transverse flange 106 provided with an axial opening 106a which has inserted in it a cup member 107 attached to the shaft 7c of the auger 7 by means of intervening bearings 107a, so that the entire auger group is able to be mounted and removed by means of simple translation axially in either direction.

Figure 1:
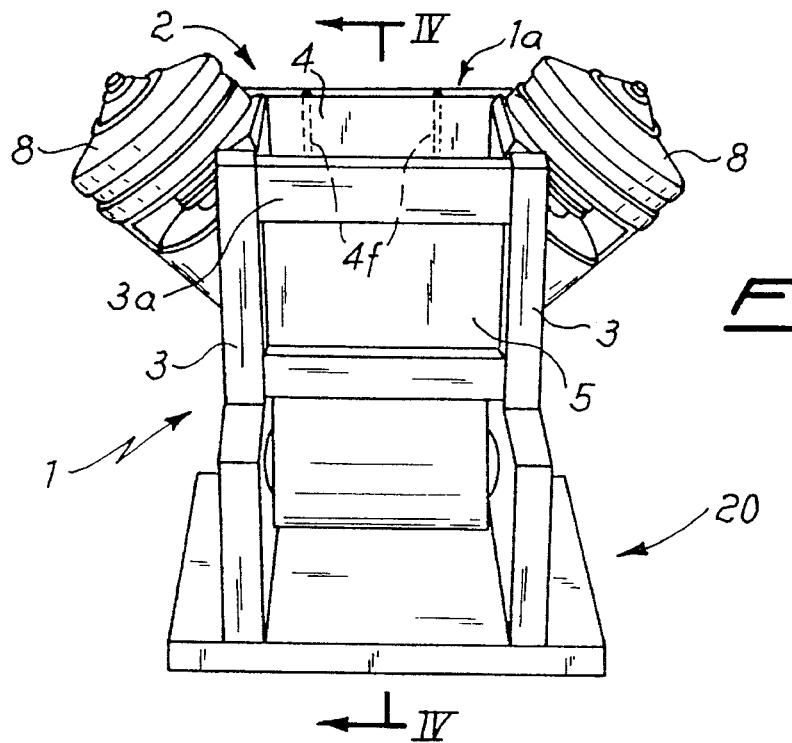
FIG. 1 is a perspective view of the apparatus according to the invention.
Figure 2:
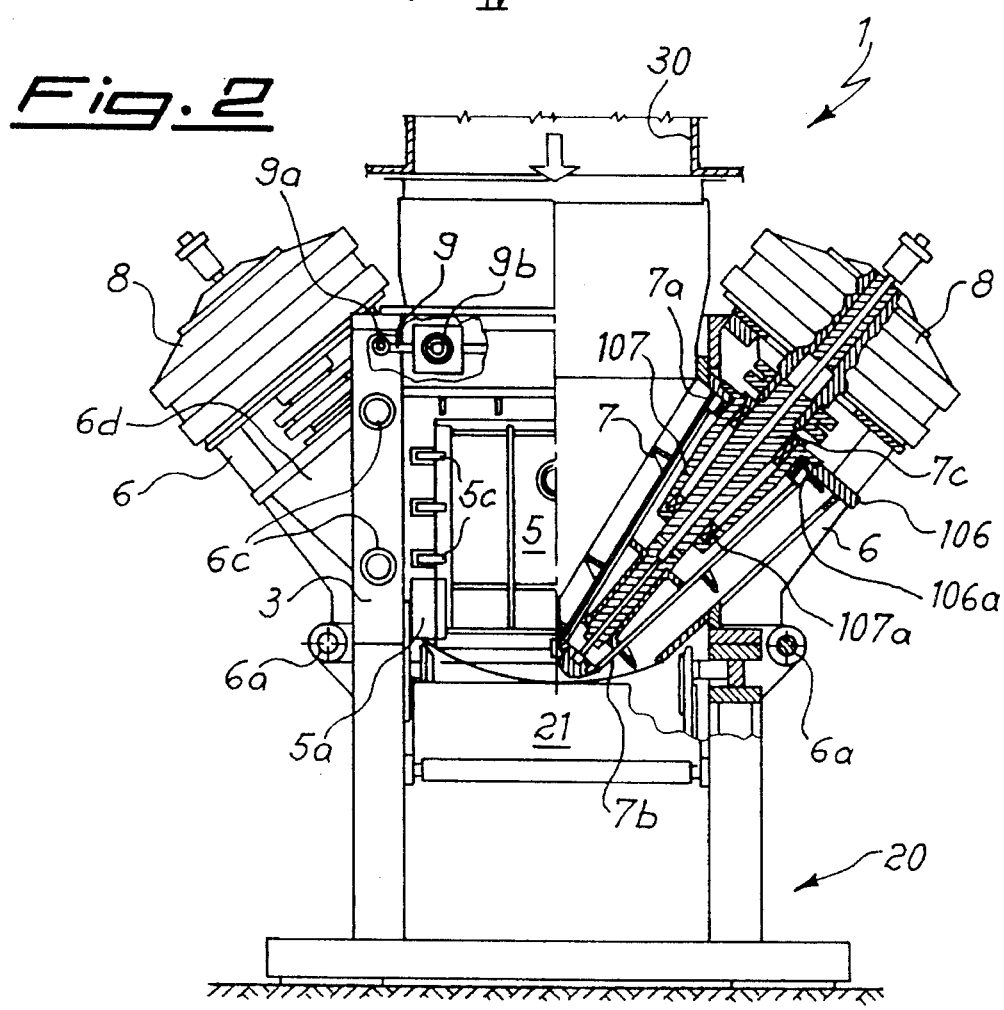
FIG. 2 is a partially sectioned front view of the apparatus according to FIG. 1.
Figure 3:
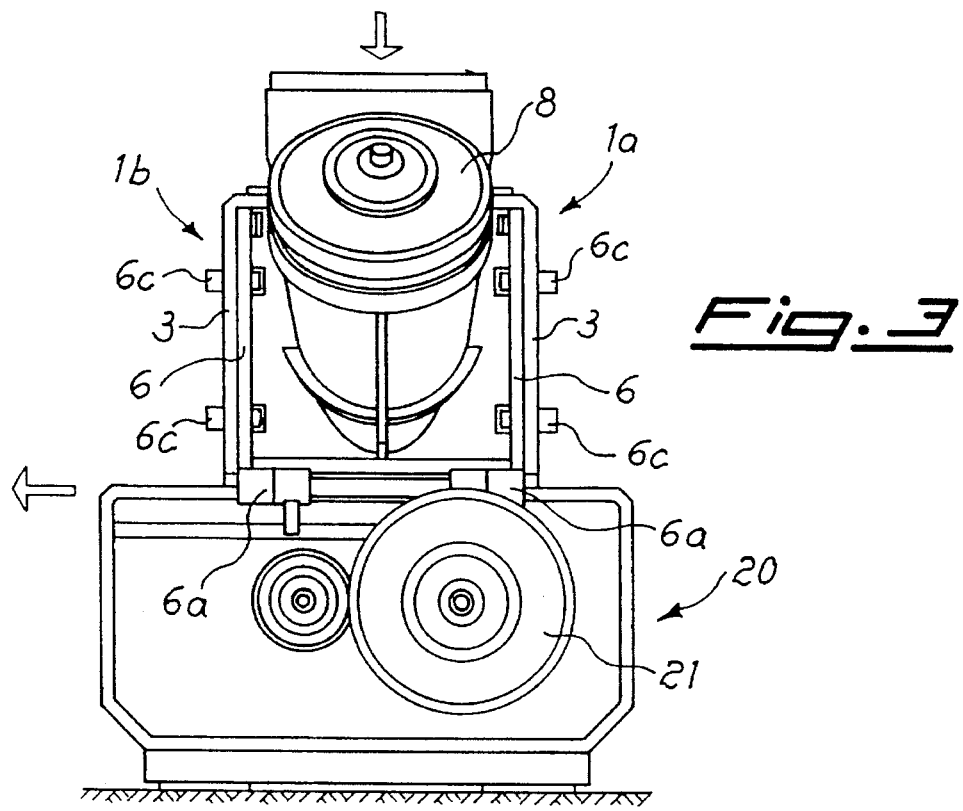
FIG. 3 is a side view of the apparatus according to FIG. 1.

As illustrated in FIG. 2, the augers 7 have helices with a variable pitch and more precisely with a configuration which is very open and vertical in the top part 7a and more closed and horizontal in the bottom part 7b; as will become more clear below, this configuration facilitates correct feeding of the material to the underlying rolling mill 20.

The shaft 7c of each auger 7 is provided with its own driving system consisting for example, in the figures, of a hydraulic motor 8 arranged coaxially with respect to the shaft of the auger 7 and at the front end thereof so as to be able to drive the augers independently of one another.

Both the front wall 5 and rear wall 4 of the hopper 2, as well as the conical wall of the frame 6 supporting the auger 7, and the shaft 7c of the auger are provided with internal ducts, 4f, 3f, 5f, 6f, 7f, respectively, through which cooling liquid is recirculated so as to obtain predetermined cooling of the aforementioned parts and hence the mixture which comes into contact with the latter.

As can be seen from FIG. 5, the frame 6 supporting the augers 7 is connected at the top to the end 9a of a telescopic arm 9, the other end 9b of which is hingeably mounted on the fixed uprights 3 so that it is possible, when required, to tilt the entire auger/motor assembly from its inclined working position into a position swung downwards and outwards so as to allow easy access to the hopper 2 and/or to the augers 7 themselves for the normal cleaning and/or maintenance operations.

Operation of the apparatus according to the invention is as follows: the mixture batch, coming for example from an internal mixer schematically indicated by 30 FIG. 2 and 5, is fed directly or via a conveyor belt to the hopper 2, into which it falls simply by means of gravity; inside the hopper, the block is subjected to the action of the two conical augers 7, arranged in a V pattern, the helix of each of which causes with its top part 7a a first thrusting of the batch towards the rear wall 4 and subsequently, with its bottom helical section 7b, a further thrusting movement downwards, i.e. towards the underlying rolling machine 20; it must be emphasized that the vertical configuration of the apparatus facilitates this downward falling movement of the mass owing to the possibility of being able to exploit advantageously the entire force of gravity of the material itself which acts parallel to the thrust component exerted by the augers, and that the substantially frusto-conical shape of the hopper facilitates the collection and regular feeding of the material itself to the underlying rolling machine or the like with which the feeding apparatus will also be synchronized by means of a suitable device.

Upon coming into contact with the rear wall 4 of the hopper 2, the mixture also undergoes a predetermined cooling action, retaining its own characteristics and at the same time being made to assume the best condition for subsequent rolling and/or extrusion.

Many variations may be introduced as regards realization of the parts which make up the invention, without thereby departing from the protective scope of the present patent.

I claim:

1. An apparatus for continuously feeding a machine with a batch of material, comprising:

a support;

means forming a vertical hopper on said support, said hopper having an upper opening for receiving said batch and a lower outlet for discharging said material;

a pair of conical augers on opposite sides of said hopper rotatable to feed said material to said outlet;

a respective drive connected with each of said augers for driving said augers independently of one another;

means for cooling said augers and at least one wall of said hopper; and respective mounting means on said support for each of said augers for retaining said augers in operating positions wherein said augers are inclined to a vertical and converge downwardly in said hopper in a V-pattern, and for tilting said augers from said operating positions into inoperative positions wherein said augers are substantially horizontal in a standstill state of said apparatus.

2. The apparatus defined in claim 1 wherein said mounting means comprises a respective frame receiving each of said augers, and means for pivotally connecting each frame to a respective side of said hopper.

3. The apparatus defined in claim 2 wherein each of said frames has a curved wall extending along said auger and externally closing said auger.

4. The apparatus defined in claim 2 further comprising a cup member axially inserted in and secured to each of said frames, each of said augers being coaxially mounted in a respective one of said cup members by respective bearings.

5. The apparatus as defined in claim 2 wherein a rear wall of said hopper and said frames are provided with hollow cavities for recirculating cooling liquid.

6. The apparatus as defined in claim 2 further comprising a telescoping arm pivotally connected to each frame and to a respective fixed side of said hopper for tilting the respective auger therein.

7. The apparatus defined in claim 1 wherein said hopper comprises a rear fixed wall and a front wall swingably connected to said sides and formed with arcuate guides along which said front wall is displaceable.

8. The apparatus defined in claim 1 wherein each of said augers has a thread with a top section which is open and substantially vertical and a bottom section which is closed and is inclined to the vertical.

\* \* \* \* \*